United States Patent [19]

Vittrup

[11] Patent Number: 5,727,691
[45] Date of Patent: Mar. 17, 1998

[54] ANIMAL LITTER CONTAINMENT AND FILTERING APPARATUS

[76] Inventor: Thomas Niel Vittrup, 1506 Penn Springs Dr., Duncanville, Tex. 75137

[21] Appl. No.: 581,470

[22] Filed: Dec. 29, 1995

[51] Int. Cl.⁶ .............................. B07B 1/00; A01K 1/03; E05C 19/12
[52] U.S. Cl. .................... 209/235; 209/260; 119/166; 119/168; 292/11; 292/250; 292/DIG. 30
[58] Field of Search ........................... 209/233, 235, 209/236, 255, 260; 119/165, 166, 167, 168, 170; 292/11, 95, 109, 250, DIG. 30

[56] References Cited

U.S. PATENT DOCUMENTS

| | | | |
|---|---|---|---|
| 4,096,827 | 6/1978 | Cotter | 119/1 |
| 4,217,857 | 8/1980 | Geddie | 119/1 |
| 4,325,325 | 4/1982 | Larter | 119/1 |
| 4,325,822 | 4/1982 | Miller | 209/251 |
| 5,012,765 | 5/1991 | Naso et al. | 119/166 |
| 5,134,974 | 8/1992 | Houser | 119/165 X |
| 5,168,834 | 12/1992 | Buschur | 119/166 |
| 5,462,015 | 10/1995 | Murphy | 119/165 X |
| 5,598,810 | 2/1997 | Lawton, III | 119/166 |
| 5,636,594 | 6/1997 | Pina | 119/168 X |

*Primary Examiner*—Tuan Nguyen
*Attorney, Agent, or Firm*—Lisa L. B. Yociss

[57] ABSTRACT

An improved animal litter containment and filtering apparatus is disclosed. The apparatus includes a first and second container for holding particulate litter, a coupler for temporarily securing the first container to the second container, and a filter. The second container may be inverted and temporarily secured to the first container utilizing the the coupler with the filter temporarily secured between the first and second containers. The coupler includes a first part secured to an end wall of the first container and a second part secured to an end wall of the second container. The coupler is secured to only the first and second containers, and not to the filter. The first and second parts may be temporarily engaged to temporarily secure the first container to the second container. The filter includes a filter having opposing ends, and an edge engager attached to each of the opposing ends. The edge engager includes a first trough and a second trough for removeably engaging the perimeter of the first and second containers, respectively, when the containers are temporarily secured.

10 Claims, 3 Drawing Sheets

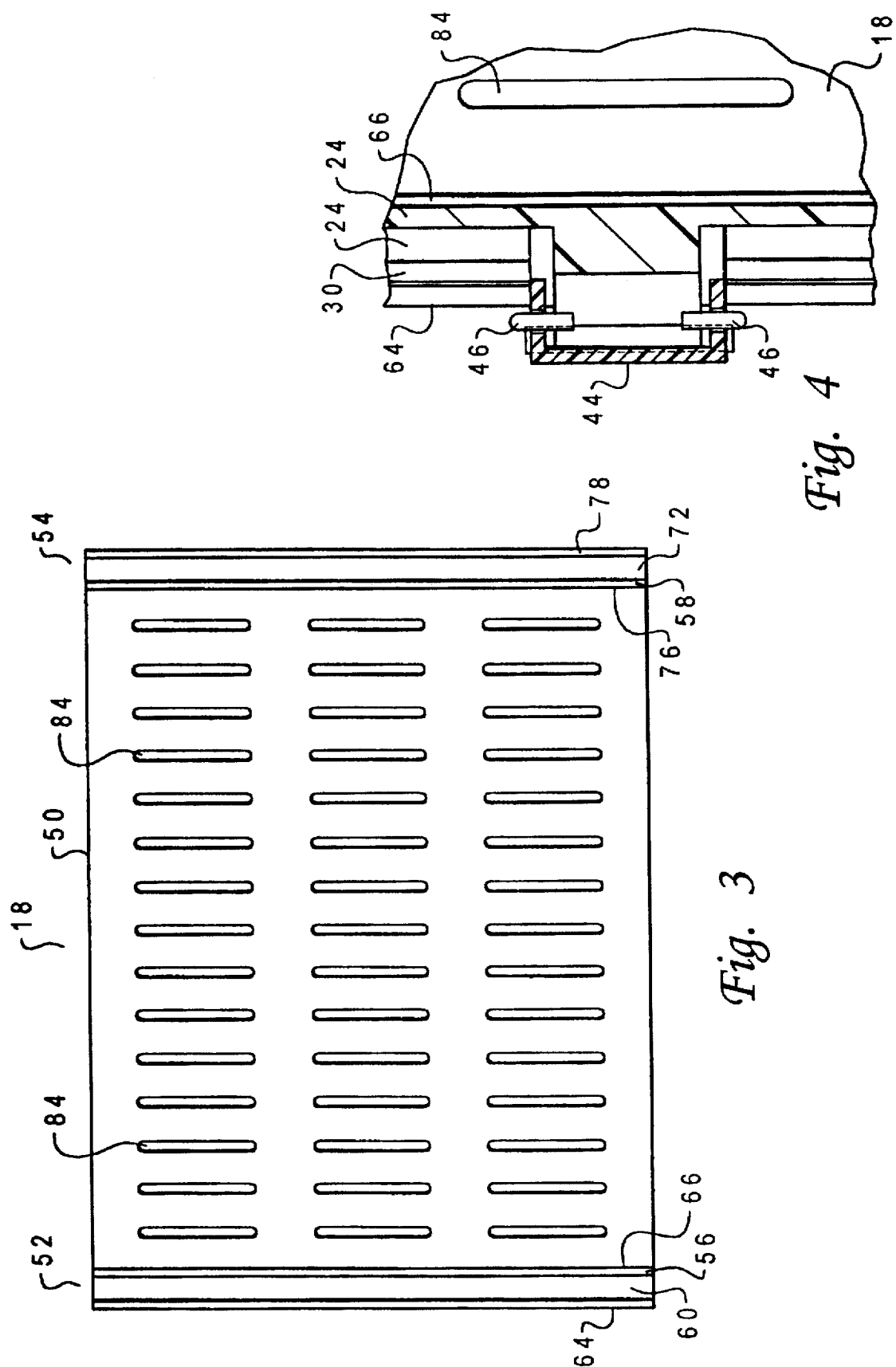

5,727,691

ANIMAL LITTER CONTAINMENT AND FILTERING APPARATUS

BACKGROUND OF THE INVENTION

1. Technical Field

The present invention relates to an improved animal litter containment and filtering apparatus, and in particular to an improved animal litter containment and filtering apparatus having a first and a second container, and coupling means secured to only the first and second containers. Still more particularly, the present invention relates to an improved animal litter containment and filtering apparatus having a first and a second container, coupling means, and filtering means including edge engagement means.

2. Description of the Related Art

Various devices have been described in the prior art to separate solid animal waste or clumps of litter from particulate litter so that the particulate litter may be reused. These devices utilize a separator or screen to separate the particulate litter. Some of these devices seek to reduce the handling of the waste and litter by including means for securing a first container to a second container having a separator placed in between the first and second container where the means for securing are secured to the separator and temporarily engage the first and second containers.

For example, U.S. Pat. No. 5,168,834 issued to Buschur describes a litter handling system including two pans and a separator between the pans. The separator includes clamping means secured to the separator utilized to temporarily secure the first pan to the second pan. The clamping means includes two clamps pivotally mounted on pivot pins near opposite ends of the separator to engage flanges on each of the two pans.

Both U.S. Pat. No. 5,012,765 issued to Naso et al. and U.S. Pat. No. 4,325,822 issued to Miller both describe a cat litter screening device having two litter pans and a screen member. The screen member may be interposed between the two litter pans when they are in opposed orientation. Tracks are included on the screen member to guide and receive both pans.

SUMMARY OF THE INVENTION

An improved animal litter containment and filtering apparatus is disclosed. The apparatus includes a first and second container for holding particulate litter, coupling means for temporarily securing the first container to the second container, and filtering means. The second container may be inverted and temporarily secured to the first container utilizing the coupling means with the filtering means temporarily secured between the first and second containers. The coupling means includes a first part secured to an end wall of the first container and a second part secured to an end wall of the second container. The coupling means are secured to only the first and second containers, and not to the filtering means. The first and second parts may be temporarily engaged to temporarily secure the first container to the second container. The filtering means includes a filter having opposing ends, and edge engagement means attached to each of the opposing ends. The edge engagement means includes a first trough and a second trough for removeably engaging the perimeter of the first and second containers, respectively, when the containers are temporarily secured.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is top view of filtering means in accordance with the present invention;

FIG. 4 is a top cross-sectional view of coupling means taken along line 4—4 shown in FIG. 2 in accordance with the present invention.

DETAILED DESCRIPTION OF PREFERRED EMBODIMENT

Figure 1:
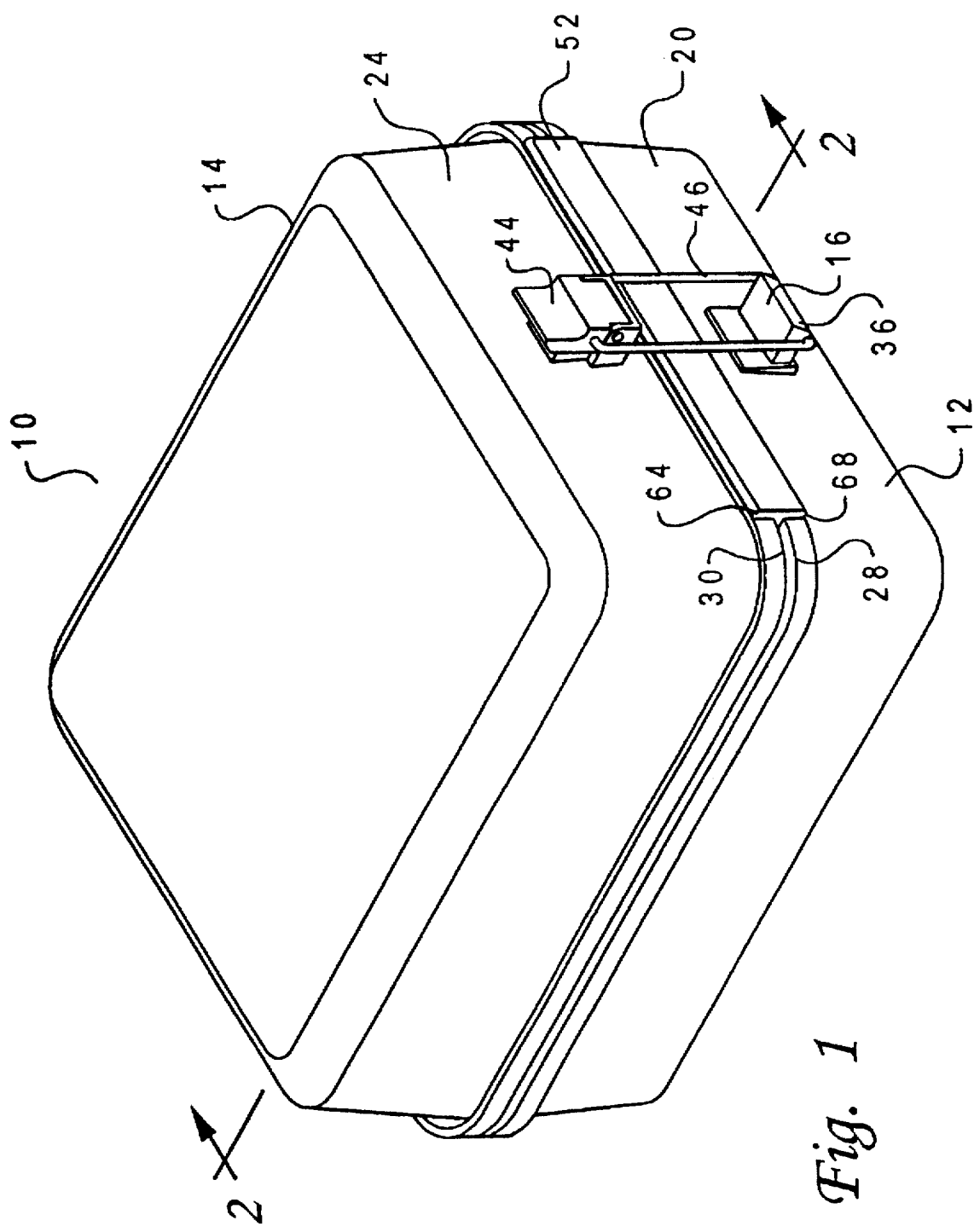
FIG. 1 is a perspective view of an improved animal litter containment and filtering apparatus in accordance with the present invention.
Figure 2:
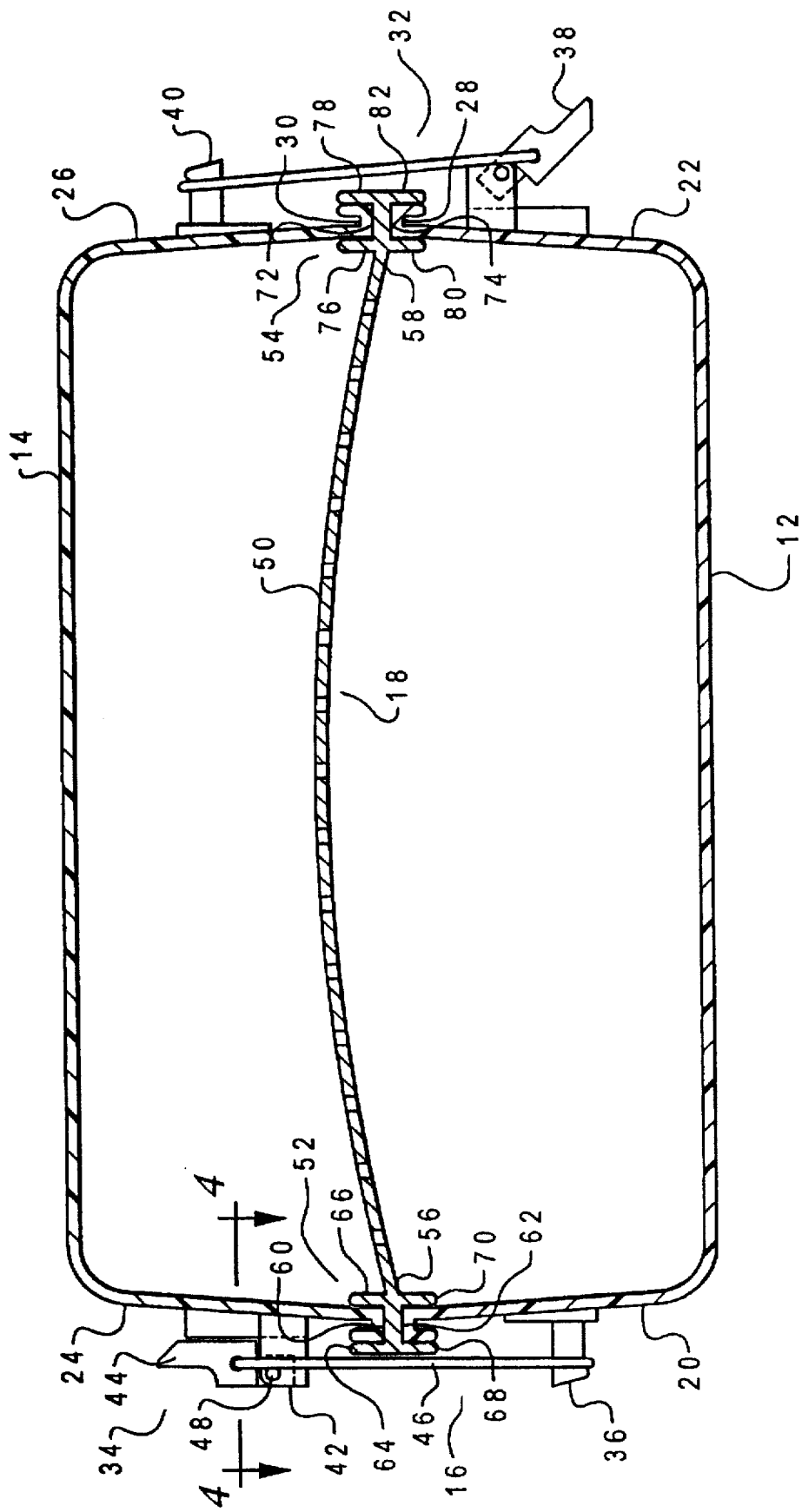
FIG. 2 is a side cross-sectional view of an improved animal litter containment and filtering apparatus including a first and a second container, filtering means, and coupling means in accordance with the present invention.

With reference now to the figures, FIG. 1 is a perspective view of an improved animal litter containment and filtering apparatus in accordance with the present invention. FIG. 2 is a side cross-sectional view of an improved animal litter containment and filtering apparatus including a first and a second container, filtering means, and coupling means in accordance with the present invention. FIG. 3 is top view of filtering means in accordance with the present invention. FIG. 4 is a top cross-sectional view of coupling means taken along line 4—4 shown in FIG. 2 in accordance with the present invention.

An improved animal litter containment and filtering apparatus 10 is disclosed to separate solid animal waste or clumps of litter from particulate litter so that the particulate litter may be reused, while reducing the handling of the waste and litter. Apparatus 10 includes a first container 12 and a second container 14, coupling means 16, and filtering means 18. Apparatus 10 may be inverted to filter the relatively clean particulate litter from first container 12 through filtering means 18 and then into second container 14. First container 12 may then be removed from second container 14. When the litter needs to be filtered again, this process may be reversed once first container 12 is inverted and secured to second container 14. Apparatus 10 may again be inverted back to its original position, thus filtering litter from second container 14 through filtering means 18 and back into first container 12. Second container 14 may then be removed so that first container 12 may be used.

First container 12 and second container 14 are preferably identical plastic containers such as is commonly known in the art for holding animal litter, such as cat litter. Each container is preferably 18½ inches long, 15³⁄₁₆ inches wide, and 5³⁄₁₆ inches high. Each container includes two opposing end walls, a perimeter, and coupling means secured to the container. First container 12 includes end walls 20 and 22, and a perimeter 28. Second container 12 includes end walls 24 and 26, and a perimeter 30. The coupling means are comprised of two parts, a moveable member and a stationary member. Each container includes a moveable member secured to one end wall and a stationary member secured to the container's opposing end wall.

First and second containers 12 and 14 may be temporarily coupled together utilizing coupling means 16 and also, preferably, a second coupling means 32. Coupling means 16 and 32 are secured to only first and second containers 12 and 14. Coupling means 16 and 32 are not secured, in any way either temporarily or permanently, to filtering means 18.

Coupling means 16 includes moveable member 34 and stationary member 36. Coupling means 32 includes moveable member 38 and stationary member 40. Moveable member 34 is secured to end wall 24 of second container 14. Stationary member 36 is secured to end wall 20 of first container 12. Moveable member 38 is secured to end wall 22 of first container 12. Stationary member 40 is secured to end wall 26 of second container 14. In this manner, one part of each coupling means is secured to an end wall of first container 12 and the other part of the coupling means is secured to an end wall of second container 14. Therefore, when second container 14 is inverted and placed on top of first container 12, the moveable member may be temporarily coupled to the stationary member for each coupling means. The coupling means are then utilized to temporarily couple first container 12 to second container 14.

Moveable member 34 includes a support 42 secured to end wall 24, a handle 44 pivotally secured to support 42, and a hook 46 pivotally secured to handle 44. Handle 44 is pivotally secured to support 42 utilizing a pair of pivot pins 48. When coupling means 16 is temporarily secured together, hook 46 is temporarily engaged with stationary member 36. In a preferred embodiment, hook 46 is generally U-shaped. However, those skilled in the art will recognize that hook 46 may be of L-shaped, C-shaped, or any other shape which will permit hook 46 to be securely, temporarily engaged with stationary member 36.

Filtering means 18 includes a filter 50, and a pair of edge engagement means 52 and 54 formed on edges 56 and 58, respectively, of filter 50. Edge engagement means 52 includes a first trough 60 and a second trough 62. First and second troughs 60 and 62 are generally U-shaped. First trough 60 is located on top of second trough 62 which is generally an inverted U-shape. First trough 60 includes a pair of side walls 64 and 66 which are removeably engaged with perimeter 30 of second container 14. Second trough 62 includes a pair of side walls 68 and 70 which are removeably engaged with perimeter 28 of first container 12. Similarly, edge engagement means 54 includes a first trough 72 and a second trough 74. First and second troughs 72 and 74 are generally U-shaped. First trough 72 is located on top of second trough 74 which is generally an inverted U-shape. First trough 72 includes a pair of side walls 76 and 78 which are removeably engaged with perimeter 30 of second container 14. Second trough 74 includes a pair of side walls 80 and 82 which are removeably engaged with perimeter 28 of first container 12.

Filter 50 includes a plurality of openings 84 spaced apart which permit particulate litter to flow through the openings while clumps of waste are filtered out and remain on top of filter 50 for easy removal. In a preferred embodiment, filter 50 is curved to ensure the clumps of waste will remain on top of filter 50.

In operation, cat litter is contained within first container 12. When this litter needs to be cleaned, filtering means 18 is temporarily and removeably engaged with perimeter 28 of first container 12. Second trough 62 and second trough 74 are both engaged with perimeter 28 of first container 12. In this manner, filter 50 is curved away from first container 12 to ensure the clumps of waste will remain on top of filter 50 when apparatus 10 is inverted. Second container 14 is then inverted and temporarily engaged with filtering means 18. First trough 60 and first trough 72 are both temporarily engaged with perimeter 30 of second container 14.

First and second containers 12, 14 may then be temporarily secured together utilizing first coupling means 16 and second coupling means 32. For example, to secure first coupling means 16, handle 44 is pivoted forward so that hook 46 may move and be located below stationary member 36. Thereafter, handle 44 is pivoted backward so that hook 46 engages stationary member 36. In order to release coupling means 16, handle 44 is pivoted forward so that hook 46 may be disengaged from stationary member 36.

While the containers are temporarily secured, the litter may be cleaned by inverting apparatus 10 so that second container 14 is now upright and on the bottom, and first container 12 is inverted and on top of second container 14. Coupling means 16 and 32 may be released by disengaging the hooks from the stationary members. First container 12 may then be removed by lifting perimeter 28 of first container 12 out of second trough 62 and second trough 74. Filtering means 18 should now contain any solid waste or clumps of litter on top of filter 50. Because filter 50 is curved, the waste or clumps should be located generally toward the middle of filter 50. In this manner, when filter 50 is lifted from second container 14, the waste and clumps will remain on filter 50. Filtering means 18 may be removed by lifting filtering means 18 so that first trough 60 and first trough 72 are removed from perimeter 30 from second container 14. Filtering means 18 and first container 12 may then be stored until needed. Second container 14 is then available for use and contains relatively clean litter.

When the litter once again needs to be cleaned, the process may then be repeated by replacing filtering means 18 so that filter 50 now curves away from second container 14. In order to do this, second trough 62 and second trough 74 will then be received by perimeter 30 of second container 14. First container 12 is then inverted and placed on top of second container 14. Perimeter 28 of first container 12 is received within first trough 60 and 72. Coupling means 16 and 32 are then utilized to couple first container 12 to second container 14. Apparatus 10 is then inverted to filter the litter.

While the invention has been particularly shown and described with reference to a preferred embodiment, it will be understood by those skilled in the art that various changes in form and detail may be made therein without departing from the spirit and scope of the invention.

What is claimed is:

1. An improved animal litter containment and filtering apparatus, comprising:
 a first and a second container for holding particulate litter, said first container having a first perimeter and said second container having a second perimeter;
 coupling means for temporarily securing said first container to said second container including a first part secured to said first container and a second part secured to said second container, wherein said coupling means is secured to and engages only said first and second container, and wherein said first part is removeably engaged with said second part to temporarily secure said second container to said first container when said second container is inverted; and
 filtering means including a filter having two opposing ends, and edge engagement means attached to each of said opposing ends, said edge engagement means having a first and a second generally U-shaped trough for removeably engaging said first and second perimeters when said second container is inverted and temporarily secured to said first container.

2. The apparatus according to claim 1, wherein said first part of said coupling means comprises a moveable member and said second part comprises a stationary member.

3. The apparatus according to claim 1, wherein said filter is curved.

4. The apparatus according to claim 1, wherein said filter includes a plurality of openings through said filter for filtering said particulate litter.

5. The apparatus according to claim 1, wherein said first trough is an inverted U-shape for removeably engaging said first perimeter, and said second trough is U-shape for removeably engaging said second perimeter.

6. The apparatus according to claim 1 wherein said first container includes two opposing end walls and said second container includes two opposing end walls, wherein said first part is secured to a first of said end walls of said first container and said second part is secured to first of said end walls of said second container.

7. The apparatus according to claim 6 further comprising a second coupling means including a first part and a second part, wherein said first part of said second coupling means is secured to a second of said end walls of said second container and said second part of said second coupling means is secured to a second of said end walls of said first container.

8. An improved animal litter containment and filtering apparatus, comprising:

a first and a second container for holding particulate litter, said first container having a first perimeter and a pair of opposing end walls, and said second container having a second perimeter and a pair of opposing end walls;

a pair of coupling means for temporarily securing said first container to said second container, wherein a first of said pair of coupling means includes a moveable member secured to a first of said end walls of said first container and a stationary member secured to a first of said end walls of said second container, and said second of said pair of coupling means includes a moveable member secured to a second of said end walls of said second container and a stationary member secured to a second of said end walls of said first container, wherein each of said pair of coupling means is secured to and engages only said first and second container, and wherein said moveable member of said first and second of said pair of coupling means is removeably engaged with said stationary member of said first and second of said pair of coupling means to temporarily secure said second container to said first container when said second container is inverted; and filtering means including a curved filter having two opposing ends, and edge engagement means attached to each of said opposing ends, said edge engagement means having a U-shaped trough located on top of a second inverted U-shaped trough, wherein said first trough is removeably engaged with said first perimeter and said second trough is removeably engaged with said second perimeter when said second container is inverted and temporarily secured to said first container.

9. A method for filtering solid waste and clumps of litter from particulate litter utilizing an apparatus including a first container having litter, comprising the steps of:

removeably securing a filtering means to a perimeter of said first container, wherein said filtering means includes a filter having two opposing ends and a pair of edge engagement means attached to said two opposing ends, and wherein each of said pair of edge engagement means includes a first U-shaped trough located on top of a second inverted U-shaped trough, wherein said filtering means is removably secured by removably securing said first trough to said perimeter of said first container;

inverting a second container and removeably securing a perimeter of said second container to said filtering means, wherein said inverting said second container includes inverting said second container and removeably securing said perimeter of said second container to said second trough;

temporarily coupling said first container to said second container utilizing a coupling means, said coupling means including a moveable member secured to said first container and a stationary member secured to said second container, wherein said coupling means is secured to only said first container and said second container;

inverting said apparatus so that said second container is upright and said first container is inverted;

removing said first container from said filtering means; and removing said filtering means so that all solid waste and clumps of litter are removed from particulate litter.

10. The method according to claim 9 wherein said moveable member includes a handle and a hook, wherein said step of temporarily coupling said first container to said second container utilizing a coupling means further comprises the step of pivoting said handle forward so that said hook is below said stationary member, then pivoting said handle backward so that said hook temporarily engages said stationary member.

* * * * *